J. H. GILMAN.
CONVEYING APPARATUS.
APPLICATION FILED JULY 7, 1913.
1,086,522.
Patented Feb. 10, 1914.
3 SHEETS—SHEET 1.
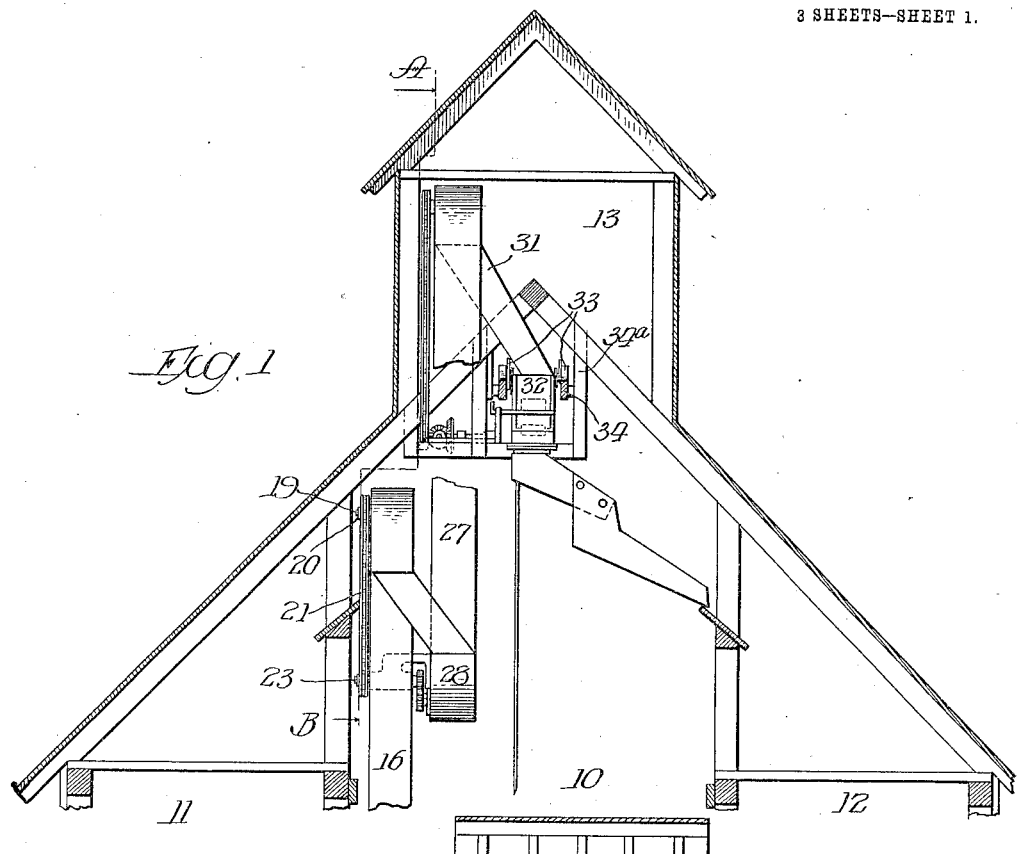

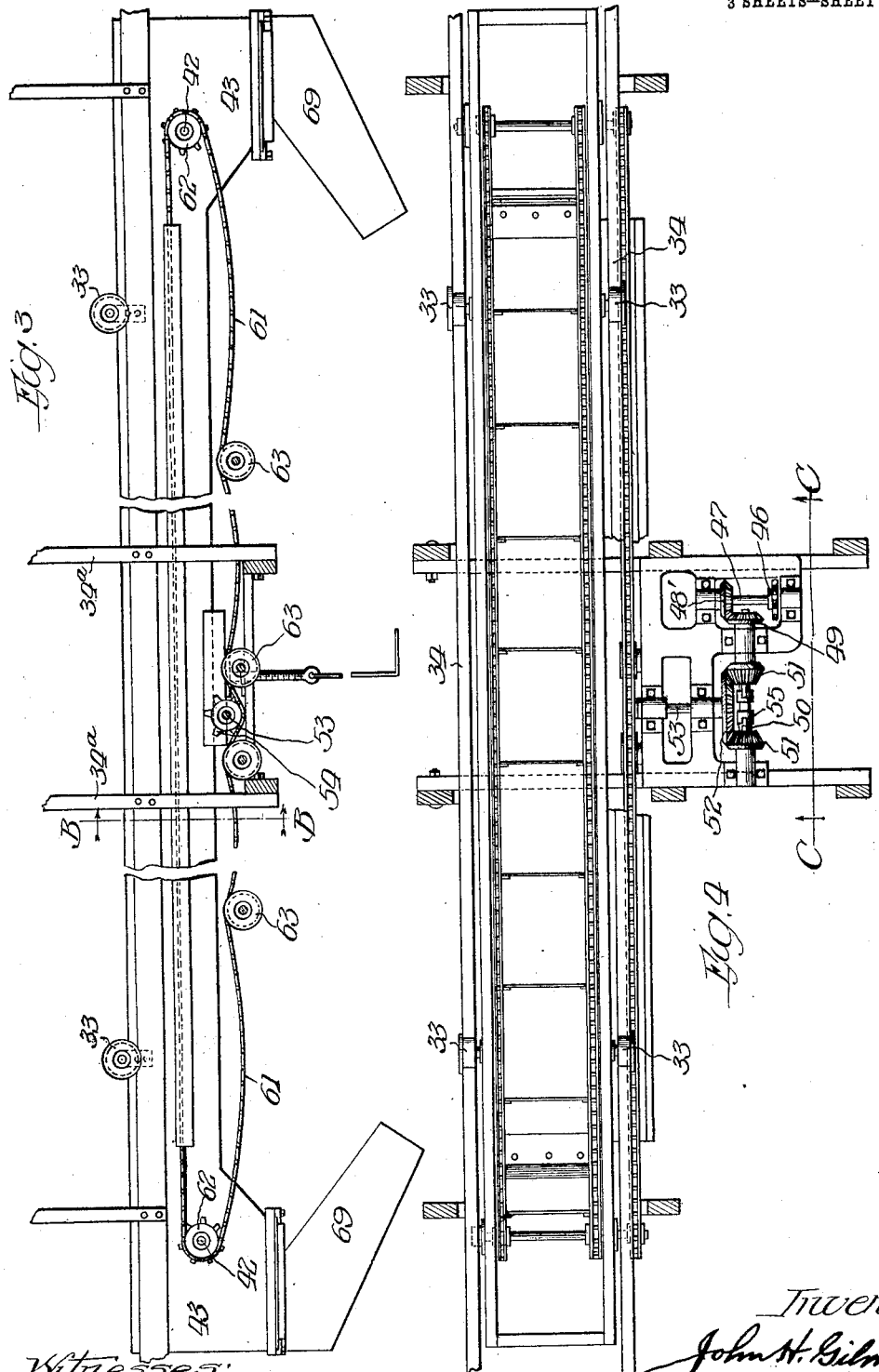

J. H. GILMAN.
CONVEYING APPARATUS.
APPLICATION FILED JULY 7, 1913.
1,086,522.
Patented Feb. 10, 1914.
3 SHEETS—SHEET 3.
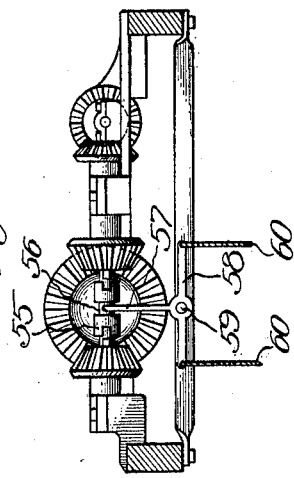
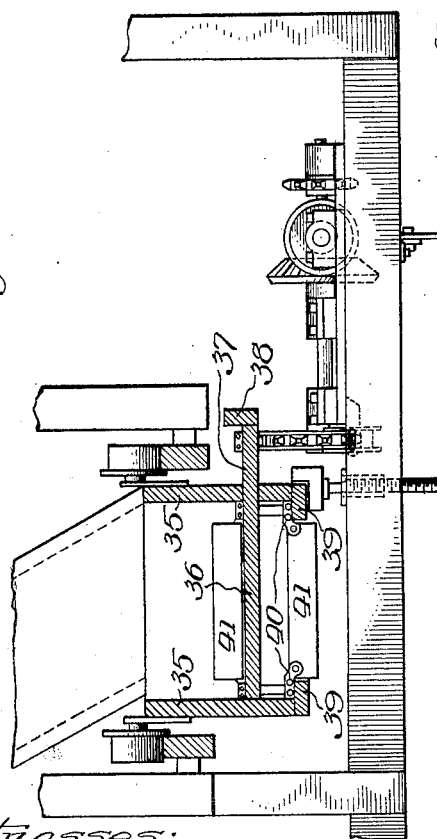
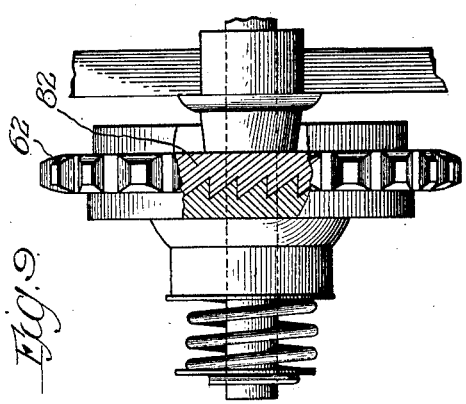
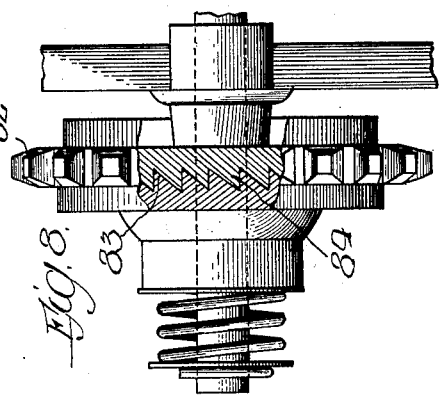
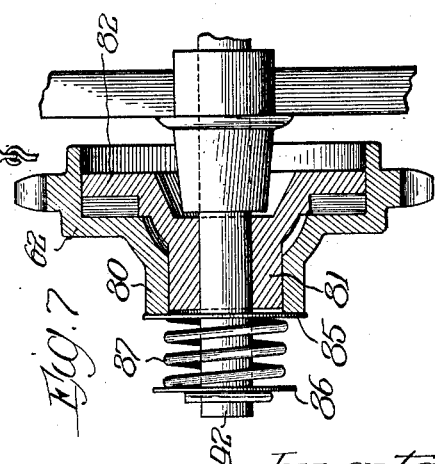
Witnesses:
H. G. Barrett
Mildred Elsner
Inventor:
John H. Gilman,
By John Howard McElroy
his Atty

UNITED STATES PATENT OFFICE.

JOHN H. GILMAN, OF OTTAWA, ILLINOIS, ASSIGNOR TO KING & HAMILTON COMPANY, OF OTTAWA, ILLINOIS, A CORPORATION OF ILLINOIS.

CONVEYING APPARATUS.

1,086,522.  Specification of Letters Patent.  Patented Feb. 10, 1914.

Application filed July 7, 1913. Serial No. 777,638.

*To all whom it may concern:*

Be it known that I, JOHN H. GILMAN, a citizen of the United States, and a resident of Ottawa, in the county of Cook and State of Illinois, have invented certain new and useful Improvements in Conveying Apparatus, of which the following is a full, clear, and exact specification.

My invention is concerned with an improvement in conveyers of the general class shown in the prior Patent No. 837,053, granted November 27, 1906, to King & Hamilton Company, as assignee of myself and Albert J Bennett, wherein a conveyer trough is provided with a pair of reversible shafts journaled in the ends thereof, each of which has rigidly secured thereon, within the trough, one or more sprocket wheels connected by one or more sprocket chains having flights at suitable intervals, so as to form an endless conveyer in the trough, and in which each of said shafts has, outside of the trough, another sprocket wheel rigidly secured thereon, the two outside sprockets being connected by a driving sprocket chain to which power is applied by a reversible sprocket wheel, which, in the course of the relative adjustments of the driving sprocket and trough, may mesh with the drive chain at various points relative to the ends of the trough.

I have found that in the use of a conveyer constructed as above described, a conflict in the tensions of the conveyer chain or chains and the drive chain sometimes arises, with the result that one or the other of them becomes broken, and it is the object of my present invention to obviate the possibility of this conflict by providing a structure in which the relative tensions of the two sets of chains can adjust itself automatically, thus absolutely preventing any possible breakage from this cause.

To illustrate my invention I annex hereto three sheets of drawings, in which the same reference characters are used to designate identical parts in all the figures, of which,—

Figure 1 is a cross section of the upper portion of a crib provided with my apparatus; Fig. 2 is a longitudinal section of the same as seen on the line A—A of Fig. 1; Fig. 3 is a side elevation of the horizontal conveyer and a portion of the supporting tracks detached from the rest of the apparatus; Fig. 4 is a top plan view of the mechanism shown in Fig. 3; Fig. 5 is a vertical section on an enlarged scale, on the line B—B of Fig. 3; Fig. 6 is a similar view on the line C—C of Fig. 4; Fig. 7 is an enlarged detail in vertical section through one of the sprocket driving wheels; Fig. 8 is a similar view of one of the driving sprocket wheels with a portion thereof in section to show the direction of the ratchet teeth; and Fig. 9 is a similar view of the other sprocket driving wheel.

Referring first to Figs. 1 and 2, I have shown my invention as applied to a crib of the construction shown in my aforesaid Patent No. 837,053, said crib containing the central driveway 10, and bins 11 and 12 at either side thereof. The crib is also preferably provided, near the central portion thereof, with the cupola 13, in which the upper portion of the elevating mechanism extends. The wagon to be unloaded is driven into the driveway and its contents discharged by any suitable means into the hopper of the lower section 16 of the elevating mechanism; the upper portion of said section being shown in Figs. 1 and 2, the lower portion being broken away.

At the upper end of the section 16, which is suitably supported in the crib at one side of the driveway in any desired manner, is the shaft 19, said shaft being driven by the conveyer chains within the section 16, as is the customary practice in such devices. The shaft 19 has secured on the outer end thereof a sprocket wheel 20, which, through the medium of the sprocket chain 21, drives a sprocket wheel 22 secured on a shaft 23 journaled in suitable bearings secured on the lower end of the upper conveyer section 27, which has journaled in the upper end thereof a shaft 30. The conveyer section 27 will be provided on its interior with the customary conveying belt, and the said conveying belt will be driven by suitable connections from the shaft 23, so that the grain carried up by the section 16 and discharged into the hopper 28 of the upper section 27 will be carried up and delivered from said upper section through the spout 31 thereof. This spout 31 discharges into the horizontal adjustable trough 32, best shown in Figs. 3 and 4, which is provided toward its ends with flanged rollers 33 which run on horizontal tracks 34 suitably supported, as by standards 34ª, from the crib structure. This trough 32 has side pieces 35 and a bottom 36, the latter preferably being extended out at one side to form a supporting ledge 37, which may be provided with a vertical flange 38, so as to form a shallow auxiliary trough or support. The sides 35 are preferably extended beneath the bottom and provided with inwardly projecting flanges 39, upon which rests the lower half of the conveyer chains 40, these chains being of the customary construction, and being provided at considerable intervals with cross bars or flights 41, so that as the chain is run in either direction over the sprocket wheels secured on the shaft 42 journaled in the ends of said trough, any material discharged from the spout 31 into the trough will be carried to one end or the other, as the case may be, and delivered into the discharge hopper 43. The shaft 30, at the upper end of the upper section, is provided with a sprocket wheel 44, which, through the medium of a sprocket chain 45 and a sprocket wheel 46 (see Fig. 1), rotates a shaft 47 journaled in suitable bearings in a casting 48, suitably supported from the crib structure at one side of the conveyer trough. The shaft 47 has secured thereon a bevel gear wheel 48', which meshes with a similar bevel gear wheel 49 rigidly secured on the shaft 50, likewise journaled in suitable bearings in the casting 48, and having loosely mounted thereon the bevel gear pinions 51 meshing with a bevel gear wheel 52 secured on a shaft 53, likewise journaled in suitable bearings in the casting 48 and having secured on its other end a sprocket wheel 54. The clutch member 55 is splined on the shaft 50 and is adapted to engage with either or neither of the pinions 51, so that the shaft 53 can be held from rotating or rotated in either direction by means of the shaft 47. This clutch member 55, as best seen in Fig. 6, is provided with an annular groove 56, with which coöperates the forked end 57 of a three-armed lever 58 suitably pivoted, as at 59, upon the crib structure, and provided with ropes 60 depending to the floor of the crib, so that the movement and direction of rotation of the driving sprocket 54 can be readily controlled from the floor. This driving sprocket 54 meshes with a driving chain 61, which is preferably supported on its upper run upon the flange 37, and which engages the sprocket wheels 62, mounted on the outer ends of the shaft 42, in a manner to be hereinafter described, and which has its return run preferably supported by the stationary bearing pulleys 63, which are suitably supported from the crib structure. The innermost pair of pulleys 63 are preferably arranged immediately adjacent to the driving sprocket 54, as shown in Fig. 3, so as to hold the chain securely in engagement with said sprocket no matter what position of adjustment the trough 32 may assume.

The structure so far described is the same as that shown in the aforesaid Gilman and Bennett Patent, No. 837,053, except that the driving sprocket wheels 62 are not rigidly secured on the shafts 42, as in the structure of the aforesaid patent. By reference to Fig. 7, which shows the sprocket wheel 62 in vertical section, it will be seen that the same is provided with a large hub 80, which is slidingly and rotatably mounted on the hub 81 of a ratchet disk 82, which is rigidly secured on the shaft 42. The driving sprocket wheel 62 is preferably cup-shaped, and is provided with radially extending ratchet teeth 83 which coöperate with oppositely directed radial ratchet teeth 84 formed on the adjacent face of the ratchet disk 82. A washer 85 preferably rests against the hub 80, and between said washer and a similar washer 86 secured at the end of the shaft 42, I interpose a helically-coiled expanding spring 87, which tends to hold the ratchet teeth in engagement, but which permits them to be disengaged when the shaft or the driving sprocket, as the case may be, is turned in the proper direction to allow the ratchet teeth to slip out of engagement. The ratchet teeth on the driving sprocket wheel 62 at one end are shaped so that when the chain 61 is driven in the proper direction, the conveyer chains will be driven by said driving sprocket wheel to bring the grain dumped in the trough to that end and discharge the same into the hopper 43 at that end, and out of the swiveling spout 69. The ratchet teeth on the other driving sprocket wheel 62 are oppositely directed, so that when the driving chain 61 is moved in the other direction, said last-mentioned driving sprocket wheel 62 will, by the engagement of its ratchet teeth with the ratchet teeth of the coöperating disk 82, drive the conveyer chains in the opposite direction, to carry the grain to that end of the trough and discharge it through that spout 69. The difference in the direction of the ratchet teeth in the two driving sprocket wheels 62 is clearly shown in Figs. 8 and 9, which are similar views, but showing the driving sprocket wheel 62 and coöperating ratchet disks 82 at the opposite ends of the trough.

By means of the slip-clutch connections herein disclosed, any variations in the tension of the driving and conveyer chains are automatically adjusted, and they will always maintain the proper relative tension in spite of any unevenness of wear or strain resulting from the reversal of the direction of movement of the chains. By my invention I have entirely obviated the breakage which occasionally resulted from the employment of the structure shown in the aforesaid Gilman and Bennett Patent No. 837,053.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a conveying apparatus, the combination with a supporting frame, of a pair of shafts journaled therein, conveyer sprocket wheels on said shafts, a conveyer sprocket chain provided with flights connecting said sprocket wheels, driving sprocket wheels on said shafts, a driving sprocket chain connecting the driving sprocket wheels, reversible driving means for said sprocket driving chain operable in all relative adjustments of the driving means and chain, and slip-clutch connections between said shafts and some of the sprocket wheels thereon, whereby the relative tensions of the conveyer and sprocket chains may automatically adjust themselves.

2. In a conveying apparatus, the combination with a supporting frame, of a pair of shafts journaled therein, conveyer sprocket wheels rigidly secured on said shafts, a conveyer sprocket chain provided with flights connecting said sprocket wheels, driving sprocket wheels loosely mounted on said shafts, a driving sprocket chain connecting the driving sprocket wheels, reversible driving means for said sprocket driving chain operable in all relative adjustments of the driving means and chain, and oppositely-directed slip-clutch connections between the shafts and the driving sprocket wheels loosely mounted thereon, whereby the relative tensions of the conveyer and sprocket chains may automatically adjust themselves.

3. In a conveying apparatus, the combination with a supporting frame, of a pair of shafts journaled therein, conveyer sprocket wheels rigidly secured on said shafts, a conveyer sprocket chain provided with flights connecting said sprocket wheels, driving sprocket wheels loosely mounted on said shafts, a driving sprocket chain connecting the driving sprocket wheels, reversible driving means for said sprocket driving chain operable in all relative adjustments of the driving means and chain, and oppositely-directed slip-clutch connections between the shafts and the driving sprocket wheels loosely mounted thereon, whereby the relative tensions of the conveyer and sprocket chain may automatically adjust themselves, said connections consisting of oppositely-directed ratchet disks secured on the shafts, correspondingly directed ratchet disks secured on the conveyer sprocket wheels, and springs pressing the two coöperating pairs of ratchet disks into engagement.

In witness whereof, I have hereunto set my hand and affixed my seal, this 2nd day of July, A. D. 1913.

JOHN H. GILMAN. [L. S.]

Witnesses:
    Ed. R. Claus,
    August Ledrich.

---

Copies of this patent may be obtained for five cents each, by addressing the "Commissioner of Patents, Washington, D. C."